United States Patent
Geeslin (10) Patent No.: US 8,146,928 B2
(45) Date of Patent: Apr. 3, 2012

(54) STROLLER WITH BRAKING DEVICE (75) Inventor: James I. Geeslin, Kennesaw, GA (US)

(73) Assignee: Excelligence Learning Corporation, Monterey, CA (US)

( * ) Notice: Subject to any disclaimer, the term of this patent is extended or adjusted under 35 U.S.C. 154(b) by 249 days.

(21) Appl. No.: 12/154,364

(22) Filed: May 21, 2008

(65) Prior Publication Data

US 2009/0289431 A1  Nov. 26, 2009

(51) Int. Cl.
*B62B 7/00* (2006.01)

(52) U.S. Cl. ............... 280/47.38; 280/658; 280/642; 188/19; 188/20

(58) Field of Classification Search ............ 280/648, 280/658, 650, 642, 657, 47.38, 33.994; 188/19, 188/20

See application file for complete search history.

(56) References Cited

U.S. PATENT DOCUMENTS

| | | | |
|---|---|---|---|
| 314,209 A | 3/1885 | Williams | |
| 422,245 A * | 2/1890 | Miller et al. | 188/20 |
| 995,480 A * | 6/1911 | Phalp | 188/20 |
| 4,018,449 A * | 4/1977 | Anderson | 280/33.994 |
| 5,370,408 A * | 12/1994 | Eagan | 280/33.994 |
| 5,713,585 A | 2/1998 | Curtis et al. | |
| 6,298,949 B1 | 10/2001 | Yang et al. | |
| 6,443,468 B1 * | 9/2002 | Eros | 280/47.38 |
| 6,817,451 B1 * | 11/2004 | Chen | 188/20 |
| 7,077,420 B1 * | 7/2006 | Santoski | 280/642 |
| 7,175,004 B2 * | 2/2007 | Kassai et al. | 188/31 |
| 7,249,779 B2 * | 7/2007 | Ehrenreich et al. | 280/643 |
| 7,273,225 B2 * | 9/2007 | Yeh | 280/648 |
| 7,448,476 B2 * | 11/2008 | Otterson | 188/19 |
| 7,780,184 B2 * | 8/2010 | Ehrenreich et al. | 280/648 |
| 2006/0181040 A1 | 8/2006 | Dunney et al. | |

* cited by examiner

*Primary Examiner* — Hau Phan
(74) *Attorney, Agent, or Firm* — Haverstock & Owens LLP (57) ABSTRACT

A stroller with a braking mechanism that automatically configures itself in a braking position provides protection against the unattended stroller from rolling away. By applying force to a handle, the braking mechanism is released and the stroller is able to be pushed as usual. The handle and braking mechanism are biased in the braking position by a spring located near the rear wheels. The braking mechanism applies sufficient frictional force against the tire of the wheel to prevent the wheel from rolling.

21 Claims, 8 Drawing Sheets

STROLLER WITH BRAKING DEVICE

FIELD OF THE INVENTION

The present invention relates to the field of strollers. More specifically, the present invention relates to baby strollers with a braking device that is biased in a braking position.

BACKGROUND OF THE INVENTION

Infant strollers for carrying babies or children are well known. Many stroller products are in the market, including foldable strollers, single seat or twin seat strollers. Whatever the stroller is, it generally includes at least three free rotating wheels for easy moving of the stroller. The user is able to easily push the stroller moving by the wheels. When the baby is in the stroller without an attendant, the stroller is easily moved and is able to endanger the baby, if the stroller rolls down a slope.

A common method for solving the aforementioned problem is to provide a brake device for the wheels. The brake devices of the prior art have to be intentionally operated by the user so as to restrain the wheel from rotation and has to be released from braking before moving the stroller. But, such a brake device is not safe enough to preclude the motion of the stroller if the user does not carefully or timely operate the brake when the stroller is supposed to stop moving. Accordingly, the stroller is able to move unintentionally and cause harm to the baby or the child staying therein.

To overcome the defects of the aforesaid brake device, a safety brake for a stroller is disclosed by U.S. Pat. No. 5,713,585. The safety brake will automatically preclude the motion of the stroller by restricting rotation of the wheels when the attendant or user leaves the stroller. The safety brake includes a brake handle movably mounted to the push handle of the stroller for being grasped during manual propulsion of the stroller, and brake assemblies mechanically coupled to the brake handle for precluding the rotation of the wheels during absence of an attendant gripping the brake handle to preclude unintentional rolling of the stroller.

However, the brake handle in the aforesaid patent has to be grasped upward to release the brake which is of the opposite direction of the push handle when the stroller has to be pushed down for lifting the front wheels during moving the stroller across stairs or obstacles. The opposite manipulation makes the obstacle-crossing more difficult.

Another brake device is disclosed by GB Patent No. 707,159. The brake device is operated by pushing a handle down with causes a locking device to be released. The locking device is positioned on the side of a rear wheel of the stroller.

Another brake device is disclosed by U.S. Pat. No. 5,713,585. The brake device is also operated by pushing a handle down which pushes an arm down which releases the brake. When the handle is released, the brake device automatically returns to a brake position, preventing the stroller from moving. The handle of the stroller is biased in a braking position by a spring mounted between a first arm and a second arm to normally force the second arm to be positioned at an upright position. The braking device includes a specialized sleeve, a pin, a spring and a series of grooves to stop the wheel from rotating.

SUMMARY OF THE INVENTION

A stroller with a braking mechanism that automatically configures itself in a braking position provides protection against the unattended stroller from rolling away. By applying force to a handle, the braking mechanism is released and the stroller is able to be pushed as usual. The handle and braking mechanism are biased in the braking position by a spring located near the rear wheels. The braking mechanism applies sufficient frictional force against the tire of the wheel to prevent the wheel from rolling.

In one aspect, a stroller comprises a frame, a handle coupled to the frame, the handle configured to move from a braking position to a release position, a braking mechanism coupled to the handle, the braking mechanism configured to apply a force directly to a wheel to prevent the wheel from rotating and a spring located near the wheel for biasing the handle in the braking position and for biasing the braking mechanism to prevent the wheel from rotating. The braking mechanism is configured to apply the force directly to a tire of the wheel. The stroller further comprises a pulling cable coupled to the handle and the braking mechanism, wherein the pulling cable pulls the braking mechanism away from the wheel when the handle is moved to the release position. The stroller is configured to hold a plurality of children. The stroller further comprises a cover coupled to the frame for covering one or more children within the stroller. The spring is an S-spring coupled to the frame and the braking mechanism. The spring biases the handle into the braking position by pulling on a pulling cable which pulls the handle into the braking position. The spring biases the handle into the braking position by pushing on a lever which pulls on a pulling cable which pulls the handle into the braking position. The braking mechanism includes a lever and a brake pad. The handle is automatically biased in the braking position.

In another aspect, a stroller comprises a frame, a set of wheels coupled to the frame for enabling the stroller to roll, a handle coupled to the frame, the handle configured to move from a braking position to a release position, a braking mechanism including a lever and a brake pad, the braking mechanism configured to apply a force directly to at least one of the set of wheels to prevent the wheels from rotating, a release mechanism coupled to the handle and the braking mechanism, the release mechanism configured for pulling the braking mechanism away from the wheel when the handle is moved to the release position and a spring coupled to the frame and the braking mechanism, located near the wheel for biasing the handle in the braking position and for biasing the braking mechanism to prevent the wheels from rotating. The braking mechanism is configured to apply the force directly to a tire of the wheel. The release mechanism is a pulling cable. The spring is an S-spring. The stroller is configured to hold a plurality of children. The stroller further comprises a cover coupled to the frame for covering one or more children within the stroller. The spring biases the handle into the braking position by pulling on the pulling cable which pulls the handle into the braking position. The spring biases the handle into the braking position by pushing on the lever which pulls on the pulling cable which pulls the handle into the braking position. The handle is automatically biased in the braking position.

In another aspect, a method of utilizing a stroller comprises automatically biasing a handle and a braking mechanism in a braking position, wherein the handle and the braking mechanism are biased in the braking position by a spring located near a wheel, applying a force to the handle causing the handle and the braking mechanism to move to a release position and pushing the stroller with the handle in the release position. The braking mechanism applies force against the wheel to prevent the wheel from moving when the braking mechanism is in the braking position. The braking mechanism applies force against a tire of the wheel to prevent the wheel from moving when the braking mechanism is in the braking position. The handle pulls a pulling cable which moves the braking mechanism from the braking position to the release position when the handle is pushed into the release position. The spring biases the braking mechanism into the braking position by applying force against the braking mechanism. The spring biases the handle into the braking position by pulling on a pulling cable which pulls the handle into the braking position. The spring biases the handle into the braking position by pushing on a lever which pulls on a pulling cable which pulls the handle into the braking position. The braking mechanism includes a lever and a brake pad. The stroller is configured to hold a plurality of children. The stroller includes a cover for covering one or more children within the stroller.

In another aspect, a braking mechanism for a stroller comprises a brake pad, a lever coupled to the brake pad and a spring coupled to the lever and located near a wheel, the spring for biasing a handle in a braking position and for biasing the lever to bias the brake pad against the wheel to prevent the wheel from rotating. The brake pad is configured to apply the force directly to a tire of the wheel. The braking mechanism comprises a pulling cable coupled to the handle and the lever, wherein the pulling cable pulls the lever which pulls the brake pad away from the wheel when the handle is moved to a release position. The spring is an S-spring coupled to a frame and the lever. The spring biases the handle into the braking position by applying force on a lever which pulls on a pulling cable which pulls the handle into the braking position.

In another aspect, a movable device comprises a frame, a handle coupled to the frame, the handle configured to move from a braking position to a release position, a braking mechanism coupled to the handle, the braking mechanism configured to apply a force directly to a wheel to prevent the wheel from rotating and a spring located near the wheel for biasing the handle in the braking position and for biasing the braking mechanism to prevent the wheel from rotating. The braking mechanism is configured to apply the force directly to a tire of the wheel. The device further comprises a pulling cable coupled to the handle and the braking mechanism, wherein the pulling cable pulls the braking mechanism away from the wheel when the handle is moved to the release position. The spring is an S-spring coupled to the frame and the braking mechanism. The spring biases the handle into the braking position by pulling on a pulling cable which pulls the handle into the braking position. The spring biases the handle into the braking position by pushing on a lever which pulls on a pulling cable which pulls the handle into the braking position. The braking mechanism includes a lever and a brake pad. The handle is automatically biased in the braking position.

DETAILED DESCRIPTION OF THE PREFERRED EMBODIMENT

A stroller with a braking device that automatically configures itself in a braking configuration provides protection against the unattended stroller from rolling away.

Figure 1:
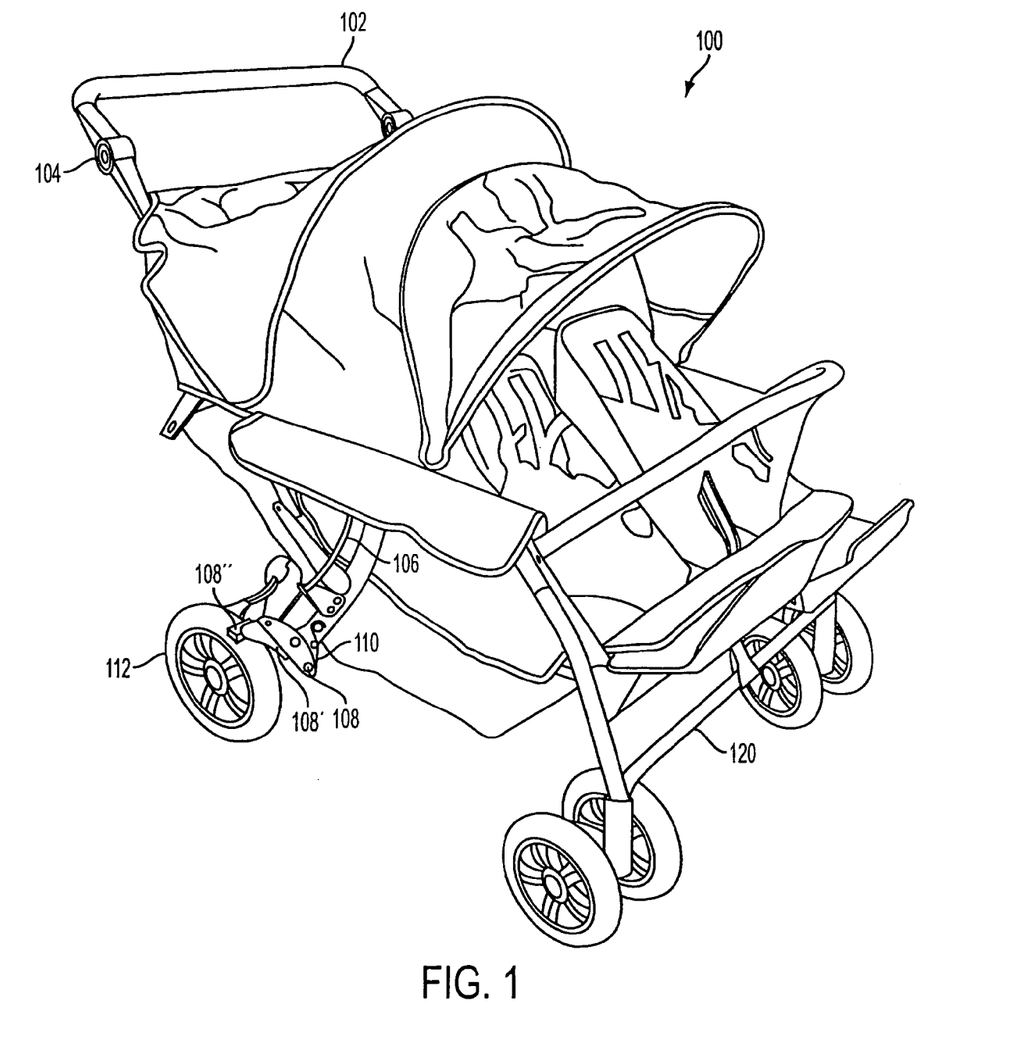
FIG. 1 illustrates a perspective view of a stroller.

FIG. 1 illustrates a perspective view of a stroller 100. In some embodiments, the stroller 100 is configured for multiple babies or children. The stroller 100 includes a handle 102 coupled to a braking mechanism 108 by a braking cable 106. In some embodiments, the braking mechanism 108 includes a lever 108' and a brake pad 108", where the brake pad 108" contacts the wheel 112 and provides sufficient force to prevent the wheel 112 from turning when the braking mechanism 108 is in a braking position. In some embodiments, the brake pad 108" contacts the tire of the wheel 112 directly and provides sufficient force to prevent the wheel 112 from turning. The handle 102 is also coupled to a frame 120 of the stroller 100 at a joint 104.

The frame 120 provides the overall support for the stroller 100, for one or more seats positioned within the frame 120, one or more covers to be positioned over the seats and a set of wheels 112 positioned to allow movement of the stroller 100.

A spring 110 is coupled to the frame 120 and the braking mechanism 108. In some embodiments, a first end of the spring is coupled to the frame 120 and a second end of the spring is coupled to the lever 108' of the braking mechanism 108. The spring 110 biases the handle 102 and the braking mechanism 108 into a braking position.

Figure 2:
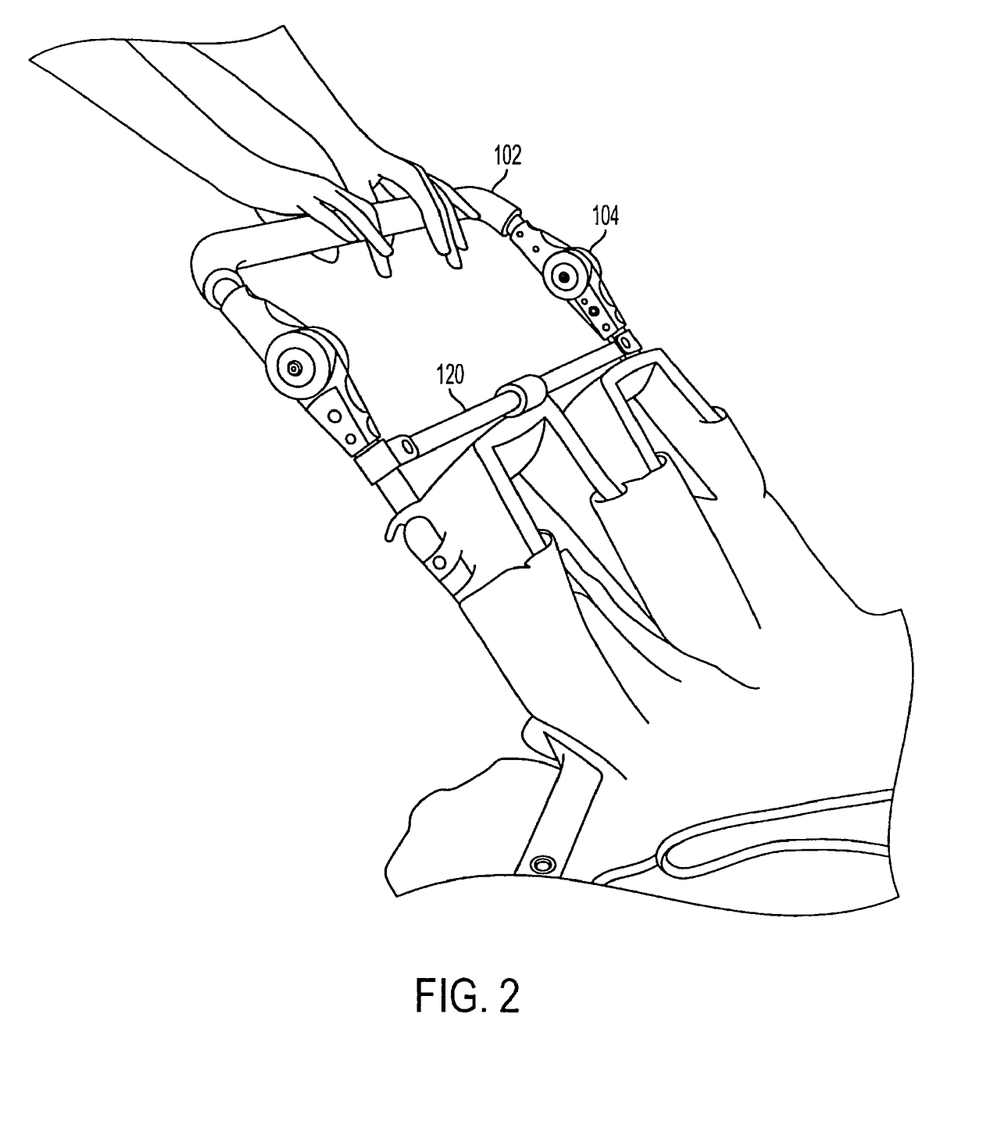
FIG. 2 illustrates a closeup perspective view of the handle of the stroller in a braking position in accordance with the present invention.

FIG. 2 illustrates a closeup perspective view of the handle 102 of the stroller 100 in a braking position. When a user is not applying force to the handle 102, the handle 102 is biased to a braking position. When the handle 102 is biased to the braking position, the braking mechanism 108 is also biased to the braking position. In some embodiments, the braking position for the handle 102 is substantially parallel with the rear part of the frame 120. In other words, the braking position for the handle 102 is similar to a handle of a frame without a joint. The braking position for the braking mechanism 108 includes the braking mechanism 108 applying sufficient frictional force against one or more wheels 112 so that the stroller 100 is unable to roll. In some embodiments, the braking mechanism 108 applies frictional force against the tire of the one or more wheels 112. A spring 110 coupled to the braking mechanism 108 biases the braking mechanism 108 and the handle 102 to the braking position. The spring 110 biases the handle 102 by pulling the pulling cable 106 which pulls the handle 102 to the braking position. The spring 110 biases the braking mechanism 108 by applying a force against the braking mechanism 108. In some embodiments, the spring 110 is an S-spring. In some embodiments, the spring 110 has a wire diameter of 4 mm, an outside diameter of 29 mm, an inside diameter of 21 mm and a total of 2 coils. In some embodiments, another mechanism is used to bias the braking mechanism 108 and the handle 102 to the braking position.

Figure 3:
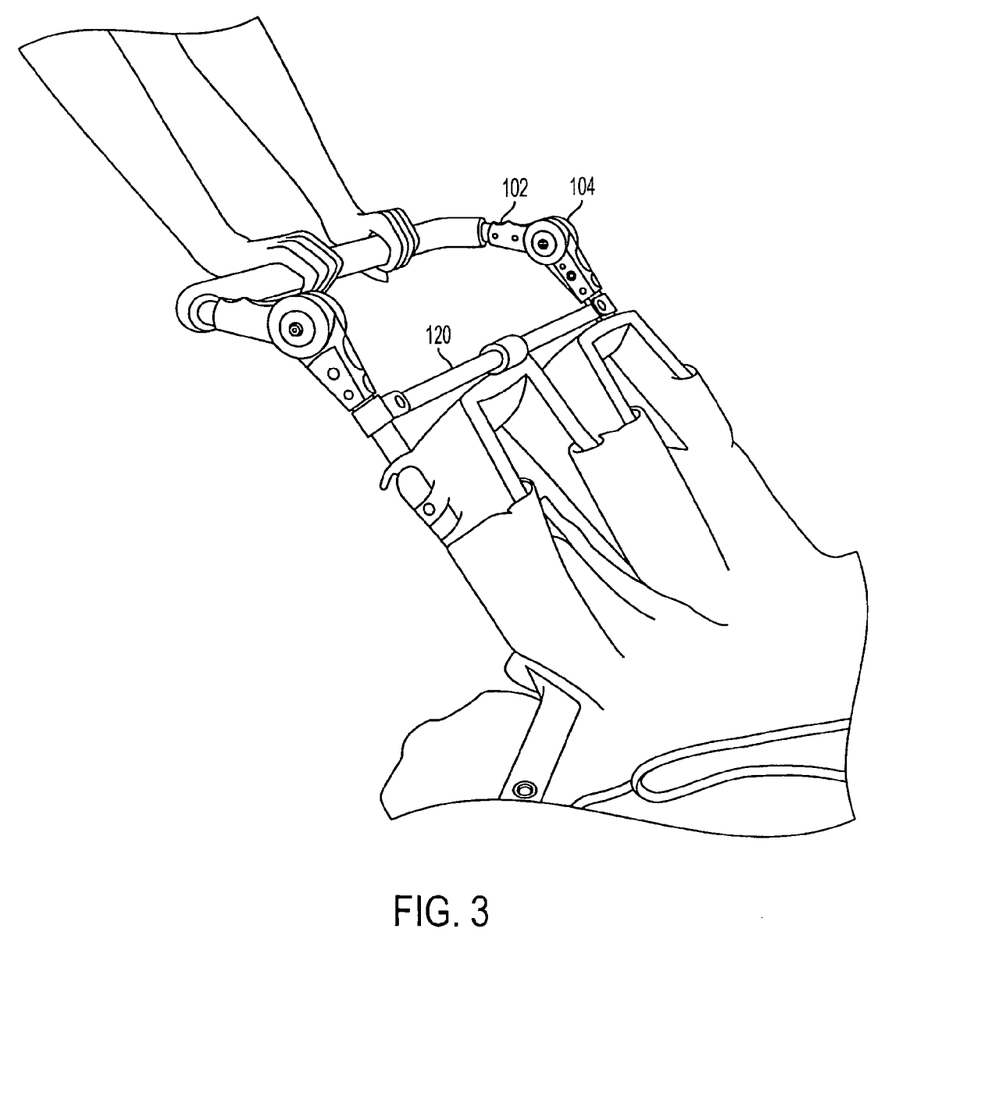
FIG. 3 illustrates a closeup perspective view of the handle of the stroller in a release position in accordance with the present invention.

FIG. 3 illustrates a closeup perspective view of the handle 102 of the stroller 100 in a release position. When a user is applying force, in some embodiments downward force, to the handle 102, the handle 102 is moved to a release position. When the handle 102 is moved to the release position, the braking mechanism 108 (FIG. 1) is also moved to the release position. In some embodiments, the release position for the handle 102 is substantially parallel with the ground. In other words, the release position for the handle 102 is similar to the braking position but with the handle 102 pushed down a few inches. The release position for the braking mechanism 108 (FIG. 1) includes the braking mechanism 108 (FIG. 1) being moved away from one or more wheels 112 (FIG. 1) so that the stroller 100 is able to roll without resistance from the braking mechanism 108 (FIG. 1). The pulling cable 106 (FIG. 1) pulls the braking mechanism 108 (FIG. 1) away from the one or more wheels 112 (FIG. 1). To move the braking mechanism 108 (FIG. 1) to the release position, the force of the pulling cable 106 (FIG. 1) is greater than the biasing force of the spring 110 (FIG. 1).

Figure 4:
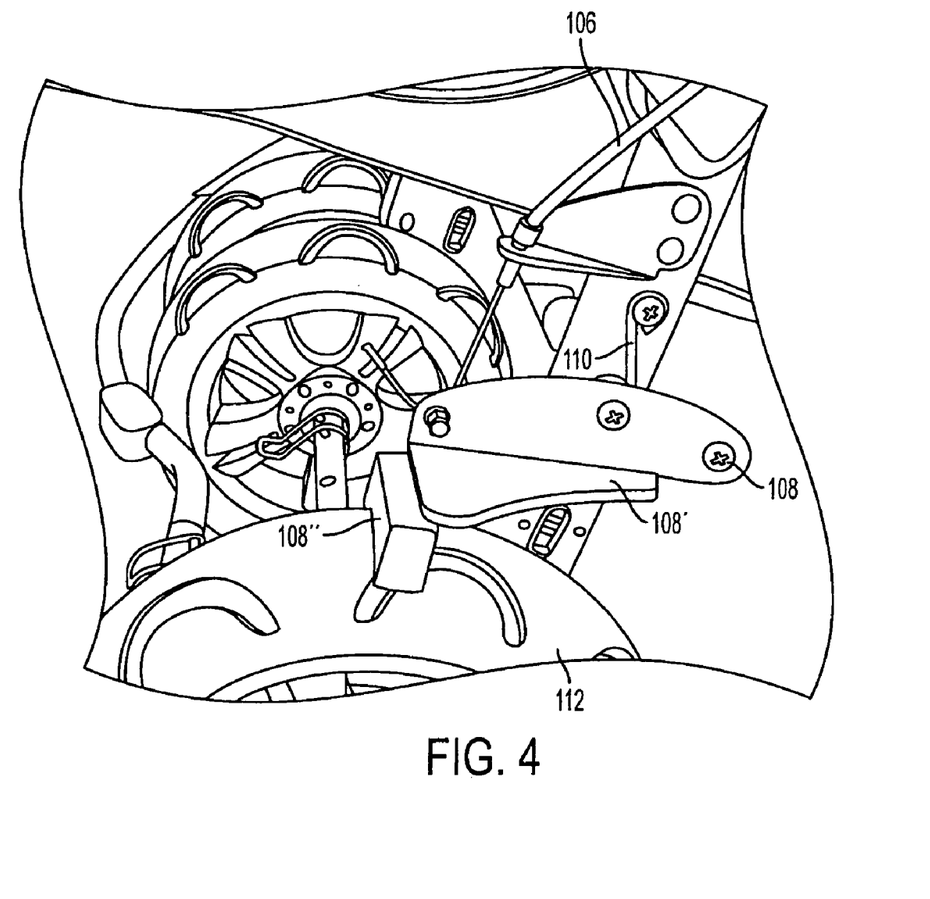
FIG. 4 illustrates a closeup perspective view of the braking mechanism of the stroller in a braking position in accordance with the present invention.

FIG. 4 illustrates a closeup perspective view of the braking mechanism 108 of the stroller 100 in a braking position. As described above, when the stroller 100 is in a neutral position, such that a user is not applying force on the handle 102, the braking mechanism 108 is biased in a braking position. The braking mechanism 108 is biased in the braking position by the spring 110. The spring 110 is configured to provide a force pushing the braking mechanism 108 against the wheel 112 to ensure the stroller 110 does not move. In some embodiments, the braking mechanism 108 is pushed against the tire of the wheel 112. In some embodiments, a first end of the spring 110 is coupled to a lower, rear part of the frame 120 of the stroller 100 and a second end of the spring 110 is coupled to the braking mechanism 108.

Figure 5:
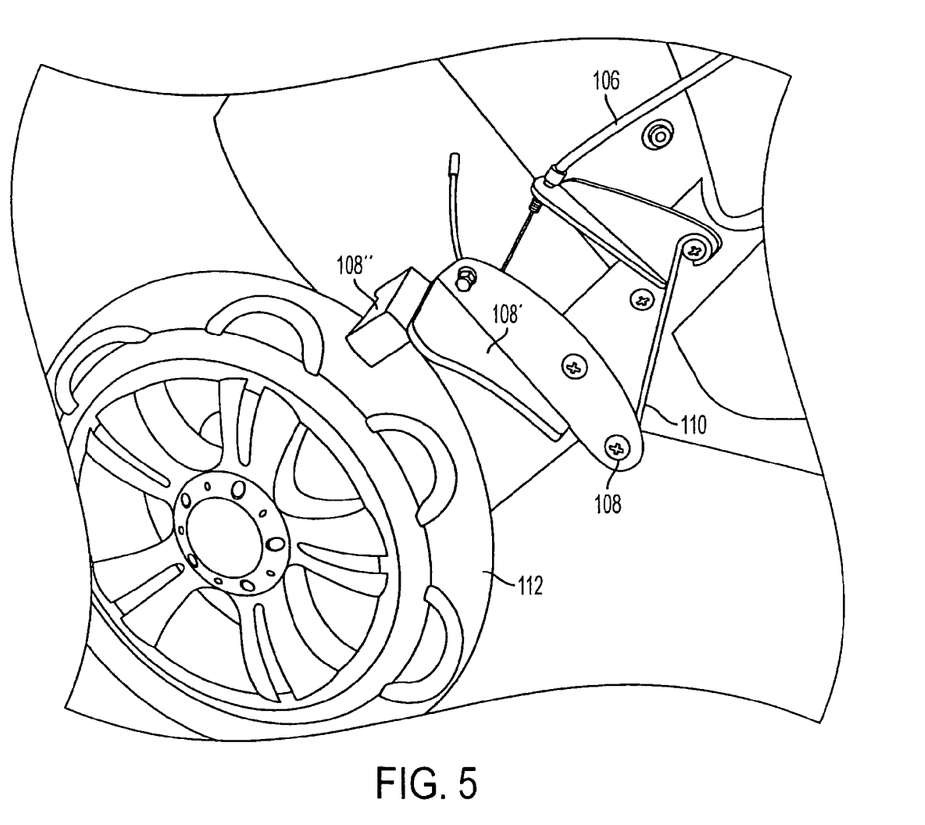
FIG. 5 illustrates a closeup perspective view of the braking mechanism of the stroller in a release position in accordance with the present invention.

FIG. 5 illustrates a closeup perspective view of the braking mechanism 108 of the stroller 100 in a release position. As described above, when the stroller 100 is in a release position, such that a user is applying force on the handle 102 to push the stroller forward, the braking mechanism 108 is in a release position. The braking mechanism 108 is moved into the release position by the pulling cable 106 which is coupled to the handle 102. The pulling cable 106 pulls the braking mechanism 108 away from the wheel 112 as the handle 102 is moved to the release position.

Figure 6:
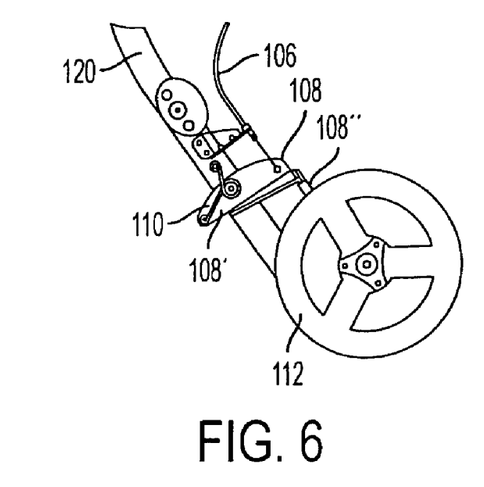
FIG. 6 illustrates a closeup view of the braking mechanism 108 of the stroller 100 in a braking position.

FIG. 6 illustrates a closeup plan view of the braking mechanism 108 of the stroller 100 in a braking position. As described above, the spring 110 which is coupled to the frame 120 and the braking mechanism 108 provides a force which pushes the braking mechanism 108 against the wheel 112. In some embodiments, the spring 110 pushes a lever 108' coupled to a brake pad 108" of the braking mechanism 108, and the brake pad 108" contacts the wheel 112. In some embodiments, the contact point for the braking mechanism 108 is the tire of the wheel 112. In some embodiments, when the spring 110 pushes the lever 108' of the braking mechanism 108, the braking mechanism 108 pulls the pulling cable 106 which pulls the handle 102 (FIG. 1) to the braking position.

Figure 7:
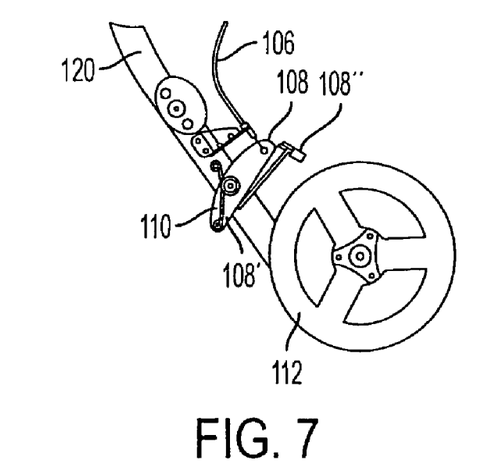
FIG. 7 illustrates a closeup view of the braking mechanism 108 of the stroller 100 in a release position.

FIG. 7 illustrates a closeup plan view of the braking mechanism 108 of the stroller 100 in a release position. As described above, the pulling cable 106, when pulled by the handle 102 (FIG. 1), provides enough pulling force to overcome the pushing force of the spring 110 such that the braking mechanism 108 is lifted away from the wheel 112, in some embodiments, the tire of the wheel 112, thus allowing the wheel 112 to rotate.

Figure 8:
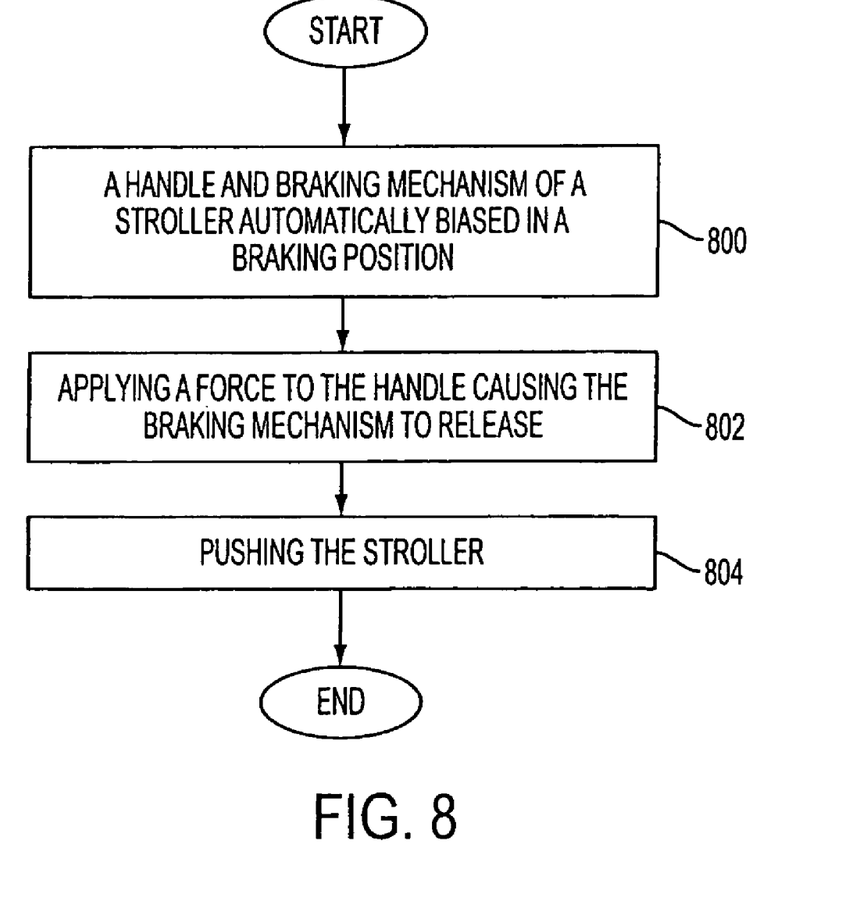
FIG. 8 illustrates a flowchart of a method of operating a stroller with an automatic braking mechanism biased by a spring located near a rear wheel in accordance with the present invention.

FIG. 8 illustrates a flowchart of a method of operating a stroller with an automatic braking mechanism biased by a spring located near a rear wheel. In the step 800, the handle and the braking mechanism of the stroller are automatically biased in a braking position by the spring located near the rear wheel. In the step 802, a user applies a force to the handle, in some embodiments, a substantially downward force, causing the braking mechanism to release the one or more wheels, so that the wheels are able to rotate. In the step 804, the user is able to freely push the stroller with the braking mechanism in the release position. When the user stops applying sufficient force against the handle, the braking mechanism is biased against the tire of the wheel and the handle is biased in a braking position by the spring.

Figure 9:
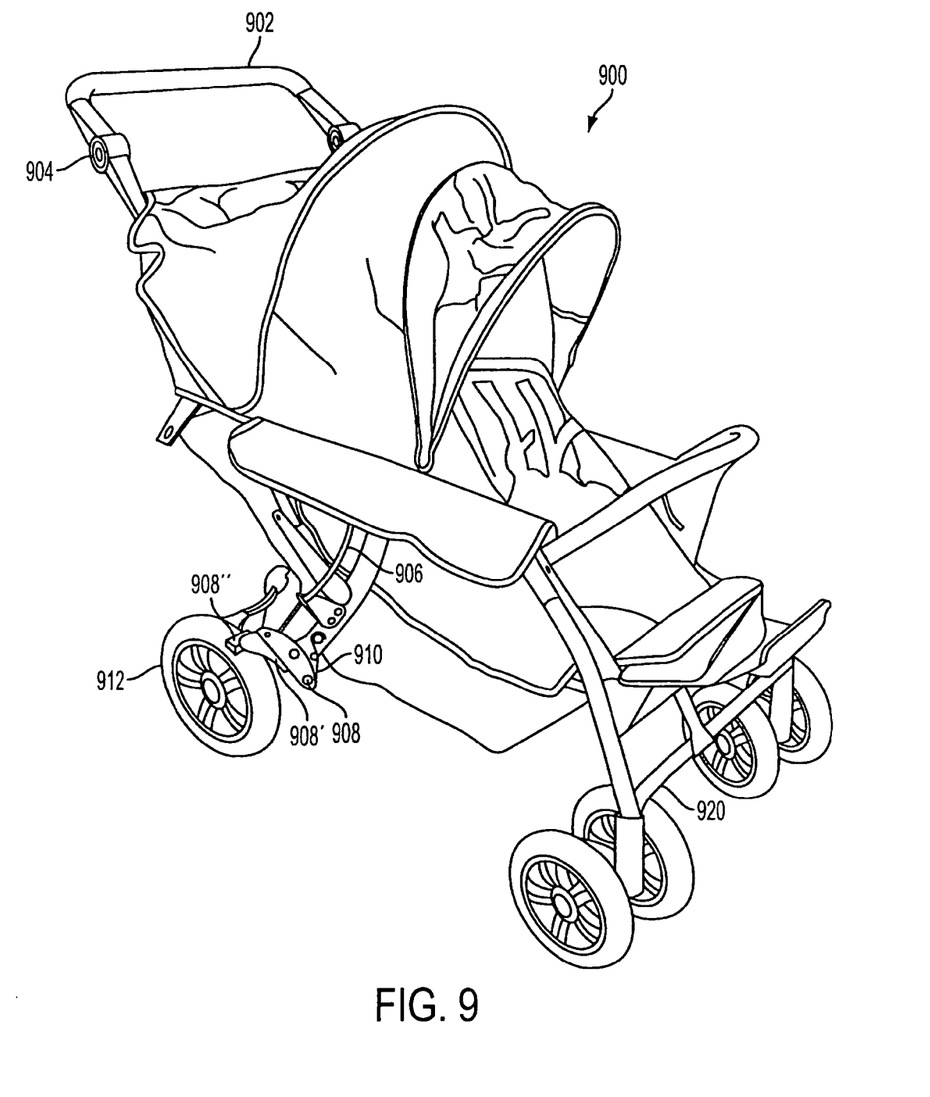
FIG. 9 illustrates a stroller configured for a single child in accordance with the present invention.

FIG. 9 illustrates a stroller 900 configured for a single child. The stroller 900 is substantially the same as the stroller 100 (FIG. 1) with the exception that it is narrower by only having one seat instead of two. The stroller 900 includes a handle 902 coupled to a braking mechanism 908 by a braking cable 906. In some embodiments, the braking mechanism 908 includes a lever 908' and a brake pad 908", where the brake pad 908" contacts the wheel 912 and provides sufficient force to prevent the wheel 912 from turning when the braking mechanism 908 is in a braking position. The handle 902 is also coupled to a frame 920 of the stroller 900 at a joint 904.

The frame 920 provides the overall support for the stroller 900 to one or more seats positioned within the frame 920, one or more covers to be positioned over the seats and a set of wheels 912 positioned to allow movement of the stroller 900.

A spring 910 is coupled to the frame 920 and the braking mechanism 908. The spring 910 biases the handle 902 and the braking mechanism 908 into a braking position.

To utilize the stroller with a braking mechanism, a user applies a force to the handle to release the braking mechanism from the wheel via a pulling cable. The stroller is then able to be pushed as a typical stroller, with the wheels rotating smoothly. When the user chooses to stop the stroller, the user stops applying force to the handle and the braking mechanism, with help from the spring, automatically applies a force against the wheel preventing the wheel from further rotation. In some embodiments, the braking mechanism applies a force against the tire of the wheel.

In operation, a spring located near the rear wheels causes the braking mechanism to apply a force against at least one of the wheels to stop the stroller from rolling. The spring also causes the handle to be biased in a braking or slightly upright position. The spring positioned near the rear wheel not only biases the handle in a braking position by pulling the pulling wire which is coupled to the handle but also provides the force to cause the braking mechanism to supply enough frictional force against the wheel to prevent the wheel from moving at the same time. Thus, the spring positioned in this location has a dual purpose—biasing the handle and biasing the braking mechanism. Furthermore, in some embodiments, the braking mechanism is directly positioned on the tire of the wheel to provide better braking capabilities.

In some embodiments, the handle and braking mechanism biased by a spring are not only used in strollers, but are able to be used in lawnmowers and other movable devices.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A stroller comprising:
   a) a frame;
   b) a handle coupled to the frame, the handle configured to move from a braking position to a release position, wherein the handle is moved to the release position when the handle is pushed downward regardless of direction of travel of the stroller;
   c) a levered braking mechanism located at a wheel and coupled to the handle, the braking mechanism configured to apply a force directly to the wheel to prevent the wheel from rotating; and
   d) a spring located near the wheel for biasing the handle in the braking position and for biasing the braking mechanism to prevent the wheel from rotating, wherein a first end of the spring is directly coupled to the frame and a second end of the spring is directly coupled to the braking mechanism.

2. The stroller of claim 1 wherein the braking mechanism is configured to apply the force directly to a tire of the wheel.

3. The stroller of claim 1 further comprising a pulling cable coupled to the handle and the braking mechanism, wherein the pulling cable pulls the braking mechanism away from the wheel when the handle is moved to the release position.

4. The stroller of claim 1 wherein the stroller is configured to hold a plurality of children.

5. The stroller of claim 1 further comprising a cover coupled to the frame for covering one or more children within the stroller.

6. The stroller of claim 1 wherein the spring is an S-spring coupled to the frame and the braking mechanism.

7. The stroller of claim 1 wherein the spring biases the handle into the braking position by pulling on a pulling cable which pulls the handle into the braking position.

8. The stroller of claim 1 wherein the spring biases the handle into the braking position by pushing on a lever which pulls on a pulling cable which pulls the handle into the braking position.

9. The stroller of claim 1 wherein the braking mechanism includes a lever and a brake pad.

10. The stroller of claim 1 wherein the handle is automatically biased in the braking position.

11. A stroller comprising:
    a) a frame;
    b) a set of wheels coupled to the frame for enabling the stroller to roll;
    c) a handle coupled to the frame, the handle configured to move from a braking position to a release position, wherein the handle is moved to the release position when the handle is pushed downward regardless of direction of travel of the stroller;
    d) a braking mechanism including a lever and a brake pad located at a wheel of the set of wheels, the braking mechanism configured to apply a force directly to at least one of the set of wheels to prevent the wheels from rotating;
    e) a release mechanism coupled to the handle and the braking mechanism, the release mechanism configured for pulling the braking mechanism away from the wheel when the handle is moved to the release position; and
    f) a spring coupled to the frame and the braking mechanism, located near the wheel for biasing the handle in the braking position and for biasing the braking mechanism to prevent the wheels from rotating, wherein a first end of the spring is directly coupled to the frame and a second end of the spring is directly coupled to the braking mechanism.

12. The stroller of claim 11 wherein the braking mechanism is configured to apply the force directly to a tire of the wheel.

13. The stroller of claim 11 wherein the release mechanism is a pulling cable.

14. The stroller of claim 13 wherein the spring biases the handle into the braking position by pulling on the pulling cable which pulls the handle into the braking position.

15. The stroller of claim 13 wherein the spring biases the handle into the braking position by pushing on the lever which pulls on the pulling cable which pulls the handle into the braking position.

16. The stroller of claim 11 wherein the spring is an S-spring.

17. The stroller of claim 11 wherein the stroller is configured to hold a plurality of children.

18. The stroller of claim 11 further comprising a cover coupled to the frame for covering one or more children within the stroller.

19. The stroller of claim 11 wherein the handle is automatically biased in the braking position.

20. A stroller comprising:
    a) a frame;
    b) a handle coupled to the frame, the handle configured to move from a braking position to a release position, wherein the handle is moved to the release position when the handle is pushed downward;
    c) a levered braking mechanism located at a wheel and coupled to the handle, the braking mechanism configured to apply a force directly to a the wheel to prevent the wheel from rotating wherein the braking mechanism does not prevent the wheel from rotating when the handle is pushed downward and the handle is moved to the release position; and
    d) a spring located near the wheel for biasing the handle in the braking position and for biasing the braking mechanism to prevent the wheel from rotating, wherein a first end of the spring is directly coupled to the frame and a second end of the spring is directly coupled to the braking mechanism.

21. A stroller comprising:
    a) a frame;
    b) a handle coupled to the frame, the handle movable between a braking position and a release position;
    c) a levered braking mechanism located at a wheel and coupled to the handle;
    d) a spring located near the wheel for biasing the handle in the braking position and for biasing the braking mechanism to prevent the wheel from rotating; and
    e) a braking cable;
    wherein the braking cable is connected to a first end of the levered braking mechanism and the spring is connected to a second end of the levered braking mechanism.

* * * * *